(12) United States Patent
Yokozawa

(10) Patent No.: US 9,652,187 B1
(45) Date of Patent: May 16, 2017

(54) IMAGE FORMING SYSTEM THAT ENSURES CONTINUOUS USE OF PRINT RESOURCES AND IMAGE FORMING METHOD

(71) Applicant: KYOCERA Document Solutions Inc., Osaka (JP)

(72) Inventor: Yuki Yokozawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/294,326

(22) Filed: Oct. 14, 2016

(30) Foreign Application Priority Data

Oct. 22, 2015 (JP) .................................. 2015-208111

(51) Int. Cl.
*G06F 3/12* (2006.01)
*H04N 1/00* (2006.01)
*G06K 15/00* (2006.01)

(52) U.S. Cl.
CPC .......... *G06F 3/1238* (2013.01); *G06F 3/1222* (2013.01); *G06F 3/1224* (2013.01); *G06F 3/1288* (2013.01); *H04N 1/00204* (2013.01); *H04N 1/00344* (2013.01); *H04N 1/00347* (2013.01); *H04N 2201/0039* (2013.01); *H04N 2201/0094* (2013.01)

(58) Field of Classification Search
None
See application file for complete search history.

(56) References Cited

U.S. PATENT DOCUMENTS

2014/0036310 A1* 2/2014 Yokozawa ............ G06F 3/1296
358/1.15

FOREIGN PATENT DOCUMENTS

JP 7-152521 A 6/1995

\* cited by examiner

*Primary Examiner* — Dov Popovici
(74) *Attorney, Agent, or Firm* — Stein IP, LLC

(57) ABSTRACT

An image forming system includes a plurality of image forming apparatuses, a client computer, and a print server. The print server requests, in response to a new connection of the plurality of image forming apparatuses to the network, a resource related to the image formation process available for the plurality of image forming apparatuses, and a license key including a validity term of a license for using the resource in the print server to the newly connected image forming apparatuses. The print server stores the resource and the license key provided by the plurality of the image forming apparatuses and registers resource information related to the resource and the license key in a database of the print server.

4 Claims, 9 Drawing Sheets

IMAGE FORMING SYSTEM THAT ENSURES CONTINUOUS USE OF PRINT RESOURCES AND IMAGE FORMING METHOD

INCORPORATION BY REFERENCE

This application is based upon, and claims the benefit of priority from, corresponding Japanese Patent Application No. 2015-208111 filed in the Japan Patent Office on Oct. 22, 2015, the entire contents of which are incorporated herein by reference.

BACKGROUND

Unless otherwise indicated herein, the description in this section is not prior art to the claims in this application and is not admitted to be prior art by inclusion in this section.

It has been known that print resources such as fonts of a plurality of network-connected image forming apparatuses are uploaded on a network-connected print server to be shared and used with all of the image forming apparatuses.

SUMMARY

An image forming system according to one aspect of the disclosure includes a plurality of image forming apparatuses, a client computer, and a print server. The plurality of the image forming apparatuses are connected to a network. The client computer is connected to the network and creates print data. The print server causes the plurality of the image forming apparatuses connected to the network to execute an image formation process based on the print data in response to a print request from the client computer. The client computer creates print data. The print server requests, in response to a new connection of the plurality of the image forming apparatuses to the network, a resource related to the image formation process available for the plurality of the image forming apparatuses, and a license key including a validity term of a license for using the resource in the print server to the newly connected image forming apparatuses. The plurality of the image forming apparatuses provide the resource and the license key for the print server via the network in response to the print request. The print server stores the resource and the license key provided by the plurality of the image forming apparatuses and registers resource information related to the resource and the license key in a database of the print server.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
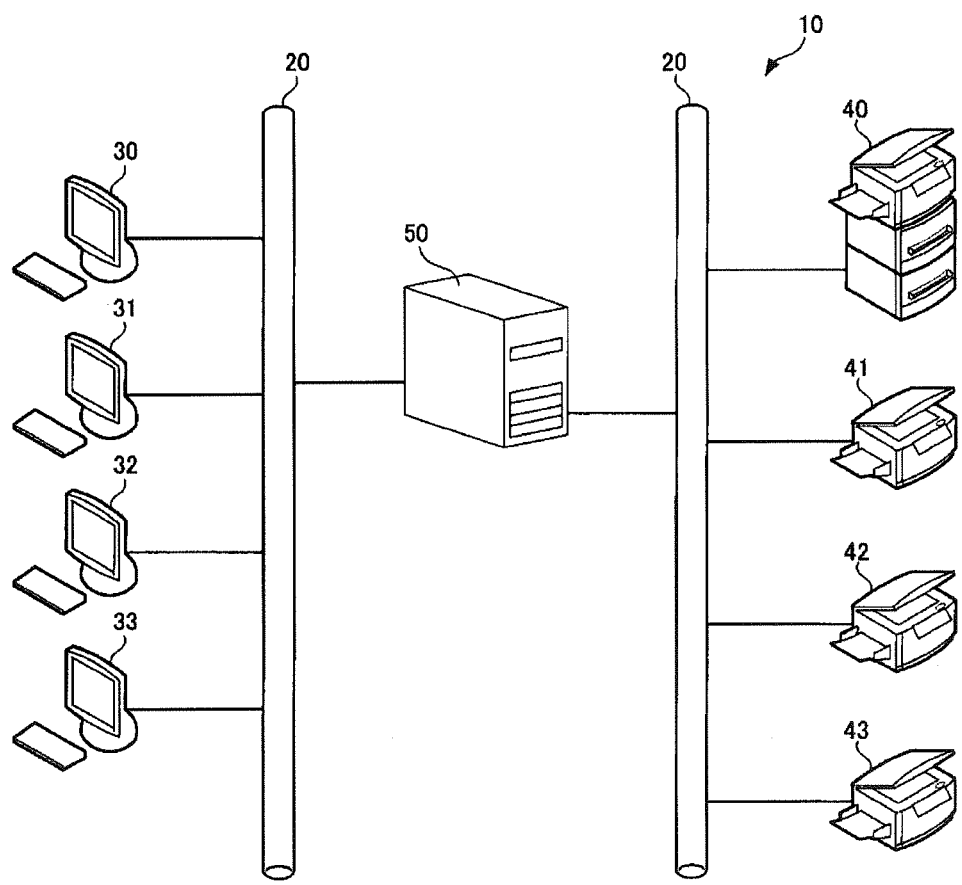
FIG. 1 schematically illustrates a configuration of an image forming system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

Hereinafter, a description will be given of an embodiment of the disclosure by referring to the drawings. FIG. 1 schematically illustrates a configuration of an image forming system 10 according to the embodiment. The image forming system 10 of the embodiment uses a print server 50, which is connected to a network, to cause each of image forming apparatuses 40 to 43 to execute an image formation process.

The image forming system 10 is constituted using a network 20 such as a local area network (LAN). The network 20 connects to a plurality of client computers 30 to 33, a plurality of the print apparatuses (image forming apparatuses) 40 to 43, and the print server 50.

As the client computers 30 to 33, widespread desktop-type Personal Computers (PCs) and notebook-type PCs can be applied. Each of the client computers 30 to 33 is, for example, a piece of equipment where pieces of software such as applications and printer driver modules are installed. These pieces of software operate on an operating system installed in each of the client computers 30 to 33.

The applications described above are, for example, pieces of software such as word-processing software and drawing creation software, which operate on the operating system. In each of the client computers 30 to 33, a user inputs text information and draw information to the word-processing software and the drawing creation software. This creates pieces of application data such as a text document and a draw document.

When printing a piece of application data, one of the client computers 30 to 33 transmits a print request to one of the print apparatuses (print apparatus 40, for example), which executes the print job. Specifically, the one of the client computers 30 to 33 creates a piece of print data based on the application data and transmits the created print data to the network 20. The print data is transferred to the print apparatus 40, which is an output destination, via the print server 50. The print apparatus 40, which is the output destination, prints out the print data by executing the image formation process based on the transferred print data.

The network 20 illustrated in FIG. 1 connects to the four print apparatuses 40 to 43. In the embodiment, the four print apparatuses 40 to 43 are divided into, for example, two types. That is, among the four print apparatuses 40 to 43, the print apparatus 40 is a high-spec model printer typified by a multifunction peripheral (MFP), for example. The print apparatus 40 has a printing function, a scan function, a FAX function, and a box function. In the embodiment, the print apparatus 40 performs print jobs that support various kinds of fonts and typefaces as resources for executing the image formation process.

On the other hand, the other three print apparatuses 41 to 43 are low-spec model printers compared with the print apparatus 40. Namely, the low-spec model print apparatuses 41 to 43 have fewer available resources than the print apparatus 40. Print Server The print server 50 functions as a server-type computer under a state connected to the network 20. The print server 50 includes hardware resources such as a CPU and a memory device, which are not illustrated. The print server 50 uses these hardware resources to execute the operating system, which is basic software for exclusive use for servers. This causes the print server 50 to establish a Platform as a server-type computer.

Figure 2:
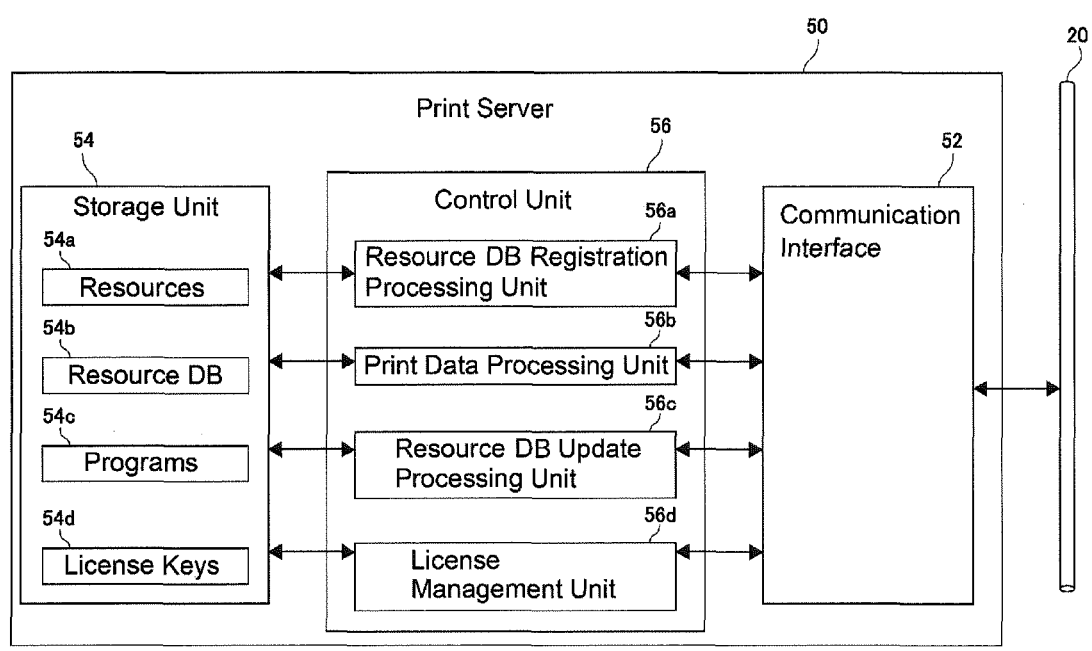
FIG. 2 schematically illustrates a configuration of a print server according to the one embodiment.

FIG. 2 schematically illustrates a configuration of the print server 50. The print server 50 includes a communication interface 52, a storage unit 54, and a control unit 56. In the print server 50, the storage unit 54 and the control unit 56 execute programs as a computer.

The communication interface 52 is a network adaptor for connecting to the network 20. The communication interface 52 transfers respective pieces of data, which have been transmitted from the client computers 30 to 33 and the print apparatuses 40 to 43, to output destinations via the network 20.

The storage unit 54 is constituted of storage media such as a read only memory (ROM) and a random access memory (RAM). The storage unit 54 stores, for example, resources 54a for executing the image formation process, a resource DB (database) 54b where pieces of resource information related to the resources are registered, programs 54c for the image forming system of the embodiment, and license keys 54d obtained from the print apparatuses 40 to 43.

The programs 54c for the image forming system of the embodiment execute the following processes: that is, (1) a registration process of the pieces of the resource information, (2) a process for causing each of the print apparatuses 40 to 43 to execute the image formation process based on the print data, (3) an update process of the resource DB 54b, and (4) management of licenses for causing the print server 50 to use the resources.

The control unit 56 is constituted of a processor (CPU), for example. The control unit 56 calls the programs 54c for the above-described processes (1) to (4) from the storage unit 54 such that they can serve to register the pieces of resource information in the resource DB 54b; to cause the print apparatuses 40 to 43 to execute the image formation process; to update the resource DB 54b; and to manage the licenses. The control unit 56 also controls communication performed by the communication interface 52.

The control unit 56 includes a resource DB registration processing unit 56a (request unit, registration unit), a print data processing unit 56b, a resource DB update processing unit 56c (determination unit, updating unit), and a license management unit 56d (determination unit) as a configuration for executing the above-described programs 54c stored in the storage unit 54.

The resource DB registration processing unit 56a stores the resources available for the print apparatuses 40 to 43 connected to the network 20 and executes the process for registering the pieces of the resource information related to the resources in the resource DB 54b. The print data processing unit 56b executes the process for causing the one of the print apparatuses 40 to 43 to execute the image formation process in response to the print request from the one of the client computers 30 to 33. The resource DB update processing unit 56c executes the process for updating the resource DB 54b. The license management unit 56d manages the license keys 54d, which have been obtained from the print apparatuses 40 to 43, to use the resources 54a.

Figure 3:
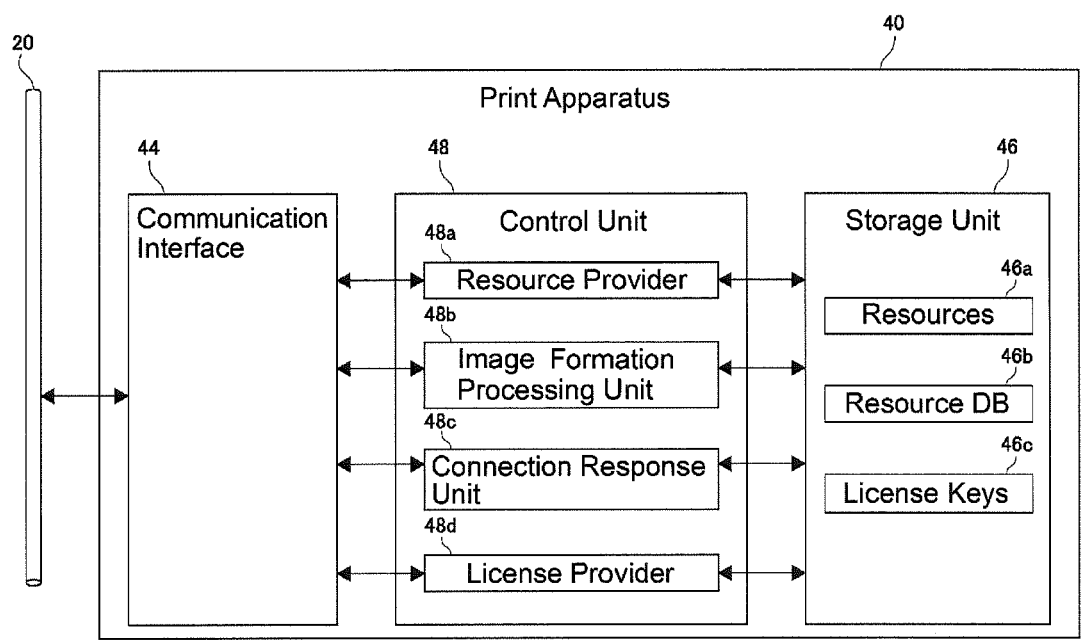
FIG. 3 schematically illustrates a configuration of a print apparatus according to the one embodiment.

FIG. 3 schematically illustrates a configuration of the print apparatuses 40 to 43. In FIG. 3, the print apparatus 40 will be taken as one example to describe a functional configuration. It is assumed that the basic configuration is common to the print apparatuses 40 to 43 with regard to (1) registration of the pieces of the resource information, (2) execution of the image formation process based on the print data, (3) update of the resource DB, and (4) management of the licenses, which are executed in the image forming system 10 of the embodiment.

The print apparatus 40 includes a communication interface 44, a storage unit 46, and a control unit 48. In the print apparatus 40, the storage unit 46 and the control unit 48 execute the programs as a computer. Communication Interface The communication interface 44 is a network adaptor for connecting to the network 20. The communication interface 44 receives and transmits data from/to the print server 50.

Storage Unit

The storage unit 46 is constituted of storage media such as a ROM and a RAM. The storage unit 46 stores resources 46a available for the print apparatus 40, a resource DB 46b in which pieces of resource information related to the resources are registered, license keys 46c for giving the print server 50 a right to use the resources 46a, and other programs necessary for the image formation process.

The control unit 48 is constituted of a processor (CPU), for example. The control unit 48 has a resource provider 48a (providing unit), an image formation processing unit 48b, a connection response unit 48c, and a license provider 48d (providing unit) to support the above-described processes (1) to (4), which are executed in the image forming system 10 of the embodiment. The resource provider 48a, when the print server 50 registers the pieces of the resource information, provides the resources 46a stored in the storage unit 46 for the print server 50 via the communication interface 44.

The image formation processing unit 48b, in response to the print request by the one of the client computers 30 to 33, executes the image formation process based on the print data transferred from the print server 50. The connection response unit 48c, during the update process of the resource DB 54b by the print server 50 if the communication interface 44 receives a signal requesting confirmation of connection from the print server 50, generates a signal to respond to the request signal. The generated response signal is transmitted from the communication interface 44 to the print server 50.

The license provider 48d, when the resource provider 48a provides the resources 46a for the print server 50, provides licenses in a form of the license keys 46c in order for the print server 50 to use the resources 46a. The license keys 46c include information related to the validity term of each of the licenses.

Figure 4:
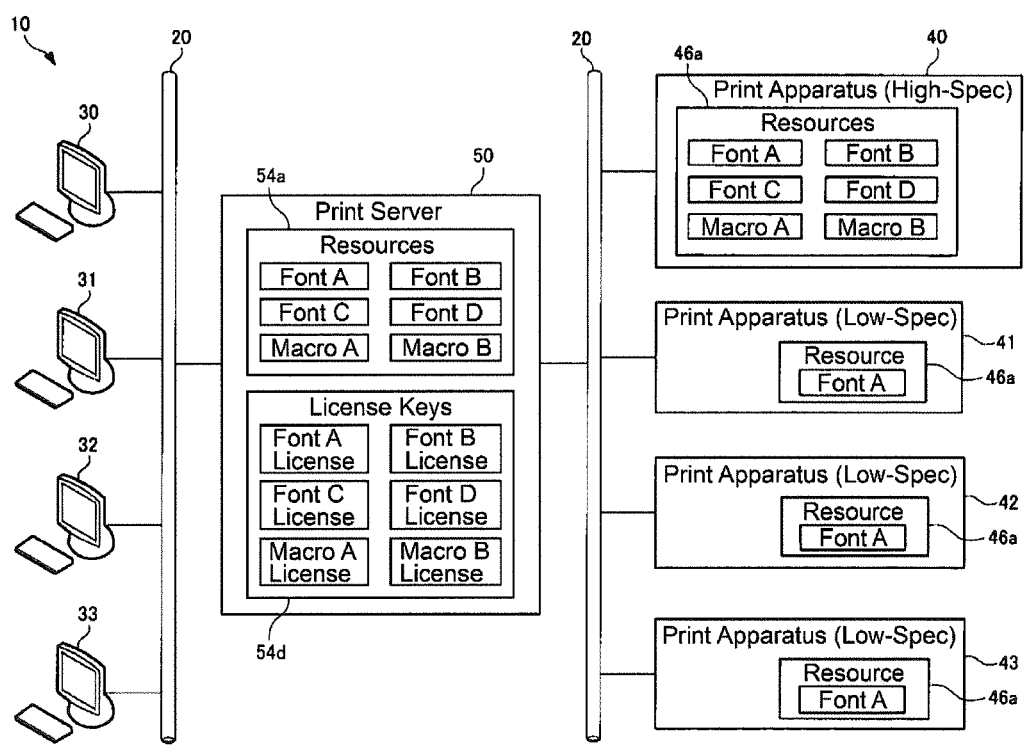
FIG. 4 explanatorily illustrates a registration process of resource information and a process for causing the print apparatus to execute an image formation process according to the one embodiment.
Figure 5:
FIG. 5 is a table indicating pieces of information registered in a resource DB according to the one embodiment.

FIG. 4 will describe a registration process of the pieces of the resource information, and a process for causing each of the print apparatuses 40 to 43 to execute the image formation process. FIG. 5 is a table indicating pieces of information registered in the resource DB 54b.

FIGS. 4 and 5 indicate fonts and macros by types as one example of the resources available for the print apparatuses 40 to 43. The print apparatus 40, which is a high-spec model, includes four kinds of fonts (font A, B, C, and D) and two kinds of macros (macro A and B) and supports these fonts and macros. On the other hand, the print apparatuses 41 to 43, which are low-spec models, include one kind of font (font A), and support this kind of font only.

In the following, first, a description will be given of a process until the resources (fonts and macros) available for the print apparatuses 40 to 43 and the pieces of the resource information are stored in the storage unit 54 of the print server 50 in the configuration of the image forming system 10 illustrated in FIG. 4.

The resource DB registration processing unit 56a of the print server 50, when the print apparatuses 40 to 43 are newly connected to the network 20, first requests the resources related to the image formation processes supported by the respective print apparatuses 40 to 43 and the license keys of the resources. This request is made, for example, at the timing when the IP address and the MAC address assigned to one of the print apparatuses (print apparatus 40, for example), which is newly connected to the network 20, are registered in the print server 50. Alternatively, the request may be made at any timing in accordance with an instruction made by an administrator who controls the print server 50.

Each of the print apparatuses 40 to 43 provides the resources in response to the request from the print server 50. That is, the print apparatus 40 provides the print server 50 with "fonts A, B, C, and D, macros A and B" and the license keys 54d corresponding to the resources. On the other hand, the print apparatuses 41 to 43 provide the print server 50 with "font A" and the license key 54d corresponding to the font A.

The resource DB registration processing unit 56a of the print server 50 stores the resources 54a and the license keys 54d provided by the print apparatuses 40 to 43 in the storage unit 54 in response to the resource request, and registers the pieces of the resource information (including the validity term information of each of the licenses) related to the resources 54a in the resource DB 54b. Namely, the resource DB registration processing unit 56a stores (installs) "font A" and the license key provided by the print apparatuses 40 to 43 and "fonts B, C, and D, and macros A and B" and the license keys provided only by the print apparatus 40 in the storage unit 54, and registers the pieces of the resource information of the resources in the resource DB 54b. This ensures that the print server 50 extracts the resources, which are stored in the storage unit 54, into the print data insofar as the print apparatuses, which have provided the resources, are connected to the network or the license keys provided by the print apparatuses are effective.

In the embodiment, the resource DB 54b registers, as the above-described pieces of resource information, type information indicating the types of the resources, identification information identifying the print apparatuses 40 to 43 as the providers of the resources, and validity term information of each of the license keys. The resource DB 54b in FIG. 5 indicates the font names "fonts A to D" by type as the type information. As the identification information to identify the print apparatuses 40 to 43, the apparatus names "print apparatuses A to D" are indicated. The apparatus names "print apparatuses A to D" correspond to "print apparatuses 40 to 43," respectively. As the validity term information of the license keys, the expiration date of each of the license keys is indicated in a year-month-date format. The identification information may be anything other than the apparatus names, which can identify each of the print apparatuses such as the IP address or the MAC address assigned to each of the print apparatuses 40 to 43.

The type information of the fonts, the identification information of the print apparatuses, and the validity term information of the license keys are associated with one another in the resource DB 54b. That is, as illustrated in FIG. 5, the pieces of information "font A," "print apparatuses A, B, C, and D," and "X year-X month-X date" are registered by being associated with one another. The pieces of information "fonts B, C, and D, macros A and B" are also associated with "print apparatus A" and "Y year-Y month-Y date" one another.

During the registration process described above, the resource DB registration processing unit 56a determines whether or not the resources and the license keys provided by each of the print apparatuses 40 to 43 are stored in the storage unit 54. Then, when the resource DB registration processing unit 56a has determined that the resources provided by each of the print apparatuses 40 to 43 are not stored in the storage unit 54, the resource DB registration processing unit 56a stores the provided resources and the license keys in the storage unit 54, and registers the pieces of the resource information of the resources in the resource DB 54b.

For example, consider a case where the print apparatus 43 is newly connected to the network 20 in a state where the print apparatuses 40 to 42 illustrated in FIG. 4 are not connected to the network 20. In this case, the print server 50 makes a request to the print apparatus 43 for the resource and the license key, and determines whether or not the storage unit 54 stores the resource (font A) and the license key provided by the print apparatus 43 in response to the request. At this time, since the storage unit 54 of the print server 50 does not store the resource (font A) and the license key, the resource DB registration processing unit 56a stores the font A and the license key in the storage unit 54. The resource DB registration processing unit 56a also registers the resource information related to the stored font A in the resource DB 54b.

For the determination described above, when the resource DB registration processing unit 56a has determined that the resource and the license key have already been stored in the storage unit 54, the resource DB registration processing unit 56a registers the pieces of the resource information related to the resources provided by the print apparatuses 40 to 43 in the resource DB 54b without storing the resources provided by the print apparatuses 40 to 43 in the storage unit 54.

As to the example described above, consider a case where the print apparatus 42 is newly connected to the network 20 after the print apparatus 43 is connected to the network 20. In this case, since the resource (font A) and the license key provided by the print apparatus 42 have already been registered in the storage unit 54, the resource DB registration processing unit 56a registers the pieces of the resource information ("font A" and "print apparatus C") related to the resource provided by the print apparatus 42 in the resource DB 54b without storing the resource and the license key provided by the print apparatus 42 in the storage unit 54.

Thus, in the image forming system 10 of the embodiment, the print server 50 obtains all the resources and license keys available for the print apparatuses 40 to 43 connected to the network 20. In view of this, even the low-spec model print apparatuses 41 to 43, which do not support "fonts B, C, and D" and "macros A and B," can print the print data with these fonts and macros as with the print apparatus 40.

The following will describe a process from a print request by the client computer 30 illustrated in FIG. 4 until execution of the image formation process by the low-spec model print apparatus 41. It is assumed that the print data prepared by the client computer 30 is specified to print with "font B."

The print data, which is transmitted in response to the print request by the client computer 30 in FIG. 4, is received by the communication interface 52 of the print server 50 via the network 20. In contrast to this, the print data processing unit 56b of the print server 50 first refers to the resource DB 54b based on the resource information (font B) specified by the received print data, and determines whether or not the resource information is registered in the resource DB 54b.

In this example, as illustrated in FIG. 5, the resource information (font B) is registered in the resource DB 54b. In this case, the print data processing unit 56b extracts the resource "font B" stored in the storage unit 54 into the print data, and causes the print apparatus 41 to execute the image formation process.

Specifically, the print data processing unit 56b of the print server 50 extracts "font B" into the print data as bitmap data. In contrast to this, the print apparatus 41 receives the print data extracted as bitmap data from the print server 50. Accordingly, the print apparatus 41 can print out the specified font by merely executing the image formation process based on the received print data.

The high-spec model print apparatus 40 illustrated in FIG. 4, unlike the print apparatus 41, supports the font B. In this case, the print server 50 may transmit the print data to the print apparatus 40 without extracting the font B into the print data.

When a resource that is not supported by the print apparatuses 40 to 43 do is specified, the print server 50 or the print apparatuses 40 to 43 extract substitute resource information into the print data.

For example, if the resource information specified in the print data is resource information (font Z), which is not registered in the resource DB 54b, the print server 50 and the print apparatuses 40 to 43 cannot extract the font Z into the print data. In contrast to this, the print server 50 may, instead of the font Z, select a substitute font (font A, for example) among the fonts (font A to D) stored in the storage unit 54. In this case, the print server 50 extracts the substitute font into the print data, and then outputs (transmits) the print data to the print apparatuses 40 to 43. Alternatively, the print apparatuses 40 to 43 may extract the above-described substitute font into the print data. In this case, the print server 50 transmits this print data to the print apparatus 40 without extracting the resource into the print data.

Figure 6:
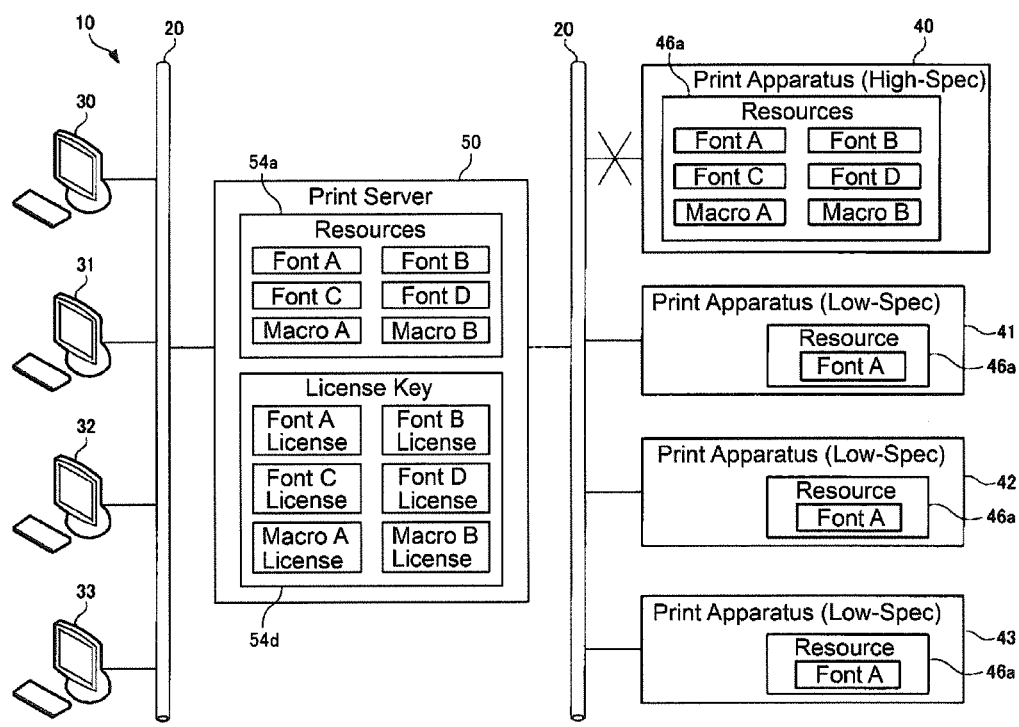
FIG. 6 illustrates an explanatory diagram of a resource DB update method according to the one embodiment.

FIG. 6 illustrates a diagram to describe a method for updating the resource DB 54b. In FIG. 6, a state where the print apparatus 40 illustrated in FIG. 4 is disconnected from the network 20 is indicated with "X" mark.

The resource DB update processing unit 56c of the print server 50 confirms whether or not the print apparatuses 40 to 43, which are the providers of the pieces of the resource information registered in the resource DB 54b, are connected to the network 20. Specifically, the resource DB update processing unit 56c outputs (transmits) a signal to the print apparatuses 40 to 43 via the communication interface 52 in order to confirm whether or not the print apparatuses are connected to the network 20.

Each of the print apparatuses 40 to 43, upon receiving the signal, transmits a signal responding to this confirmation to the print server 50. In FIG. 6, since the print apparatus 40 is disconnected from the network 20, the response signal is not transmitted from the print apparatus 40. On the other hand, each of the print apparatuses 41 to 43 receives the signal from the print server 50 and transmits the signal responding to this confirmation to the print server 50. The confirmation of connection state is preferably performed, for example, at specific intervals. Alternately, the confirmation of connection state may be performed upon a change made to the network configuration.

The resource DB update processing unit 56c, when all the print apparatuses for which any one of the resources is available in common are not connected to the network 20, determines whether or not the license key of the resource is effective. If the license key is not effective, the resource DB update processing unit 56c erases the resource from the storage unit 54, and updates the resource DB 54b by deleting the resource information related to the resource from the resource DB 54b.

For example, in the resource DB 54b illustrated in FIG. 5, all the print apparatuses, with which "font A" is associated in common, are the print apparatuses 40 to 43 (print apparatus A to D). On the other hand, all the print apparatus, with which "fonts B, C, and D, macros A and B" are associated in common, is the print apparatus 40 (print apparatus A).

In contrast to this, in the image forming system 10 illustrated in FIG. 6, the print apparatus 40 is not connected to the network 20. That is, it means that, as to the resources "fonts B, C, and D, macros A and B," the whole print apparatus (print apparatus 40), for which each of the resources is available in common, is not connected to the network 20. However, it is assumed that the license keys of the resources "fonts B, C, and D, macros A and B" are still effective. In this case, the resource DB update processing unit 56c neither erases the resources "fonts B, C, and D, macros A and B" from the storage unit 54 nor deletes the resource information of each of the resources from the resource DB 54b.

As to the resource "font A," since the print apparatuses 41 to 43 excluding the print apparatus 40 are connected to the network 20, all the print apparatuses are not always disconnected to the network 20. Accordingly, the resource "font A" is also not erased from the storage unit 54. Thus, as illustrated in FIG. 6, even after updating, the storage unit 54 of the print server 50 still keeps storing the resources "fonts A, B, C, and D, macros A and B."

As to the resource DB 54b, the type information "font A" and the identification information "print apparatus A to D" of the print apparatuses 40 to 43, which is corresponding to the type information "font A," are registered. In the confirmation of connection state described above, if the print apparatus 40 does not respond and the license key of the font A is expired, the resource DB update processing unit 56c deletes the identification information "print apparatus A" of the print apparatus 40 from the resource DB 54b.

This is the basic configuration of the image forming system 10. Additionally, in the embodiment, the image forming system 10 described above can operate by causing the computer (the control unit 56 and the storage unit 54) to execute the programs installed in the print server 50. The exemplary procedure for causing the computer of the print server 50 to execute programs for the image forming system will also be apparent in the following description.

Figure 7:
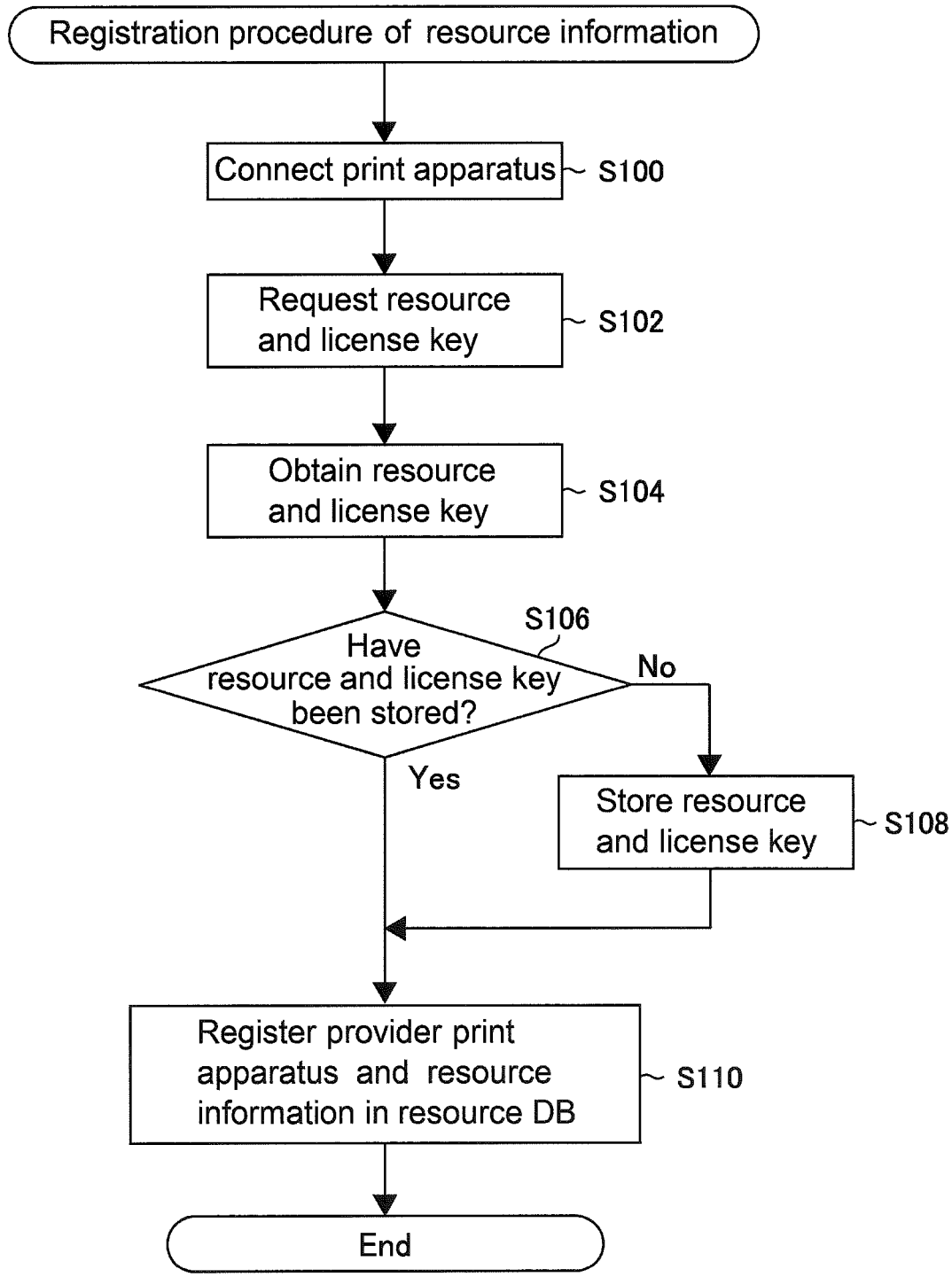
FIG. 7 illustrates a resource information registration procedure executed by a computer functioning as the print server according to the one embodiment.

FIG. 7 illustrates a registration procedure of the pieces of the resource information, which the computer of the print server 50 executes. A description will be given in accordance with the procedure.

Step S100: The print apparatuses 40 to 43 are newly connected the network. Step S102: At this time, the control unit 56 of the print server 50 makes a request to each of the print apparatuses 40 to 43, which are newly connected to the network 20, for the resources and the license keys with regard to the image formation process, which each of the print apparatuses supports. Step S104: The control unit 56 obtains the pieces of the resource information, which each of the print apparatuses 40 to 43 provides in response to the resource request, via the communication interface 52.

Step S106: The control unit 56 confirms the resources and the license keys obtained from each of the print apparatuses 40 to 43. That is, the control unit 56 determines whether or not the obtained resources and license keys are stored in the storage unit 54.

Step S108: If the obtained resources and license keys are not stored in the storage unit 54 ("No" in Step S106 above), the control unit 56 stores the resources and the license keys in the storage unit 54. The control unit 56 also registers the pieces of the resource information related to the stored resources and license keys in the resource DB 54*b* (Step S110), and terminates this process (End). On the other hand, if the resources and the license keys have been stored in the storage unit 54 ("Yes" in Step S106 above), the control unit 56 registers only the pieces of the resource information in the resource DB 54*b* without storing the obtained resources and license keys in the storage unit 54 (Step S110), and terminates this procedure (End).

Figure 8:
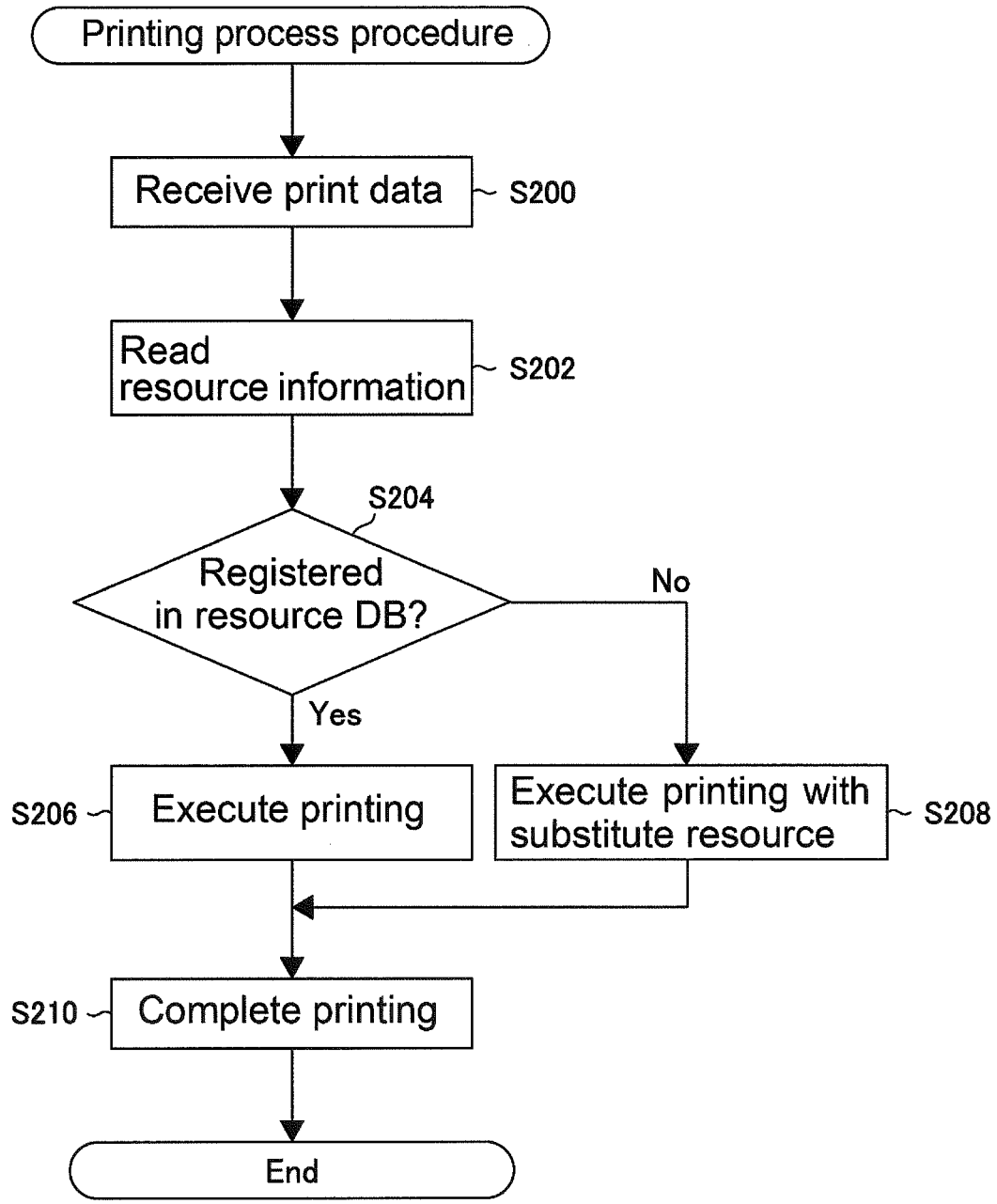
FIG. 8 illustrates a printing process procedure executed by the computer functioning as the print server executes based on the resource DB according to the one embodiment.

FIG. 8 illustrates a printing process procedure executed by the computer of the print server 50 based on the resource DB 54*b*. The print server 50 controls the pieces of print data transmitted from the plurality of the client computers 30 to 33 to the network 20.

Step S200: Each of the client computers 30 to 33, when printing application data, transmits the print data to the network 20. In contrast to this, the communication interface 52 of the print server 50 receives the print data described above via the network 20. The received print data, for example, is temporarily saved in a buffer of the print server 50. Step S202: The control unit 56 reads the resource information included in the received print data. Step S204: Next, the control unit 56 confirms whether or not the read resource information is registered in the resource DB 54*b*. If the resource information is registered in the resource DB 54*b* (Yes), the control unit 56 extracts the resource, which is stored in the storage unit 54 corresponding to the resource information, into the print data, and causes one of the print apparatus (print apparatus 40, for example) to execute the image formation process (printing process) (Step S206).

On the other hand, if the read resource information is not registered in the resource DB 54*b* (No); that is, if resource information related to a resource which none of the print apparatuses 40 to 43 support is specified on the print data, the control unit 56, instead of this resource, extracts a substitute resource available for one of the print apparatuses 40 to 43, which execute the image formation process, into the print data, and based on this, causes the one of the print apparatuses 40 to 43 to execute the image formation process (Step S208).

Extraction of the print data based on the substitute resource may be executed by the print apparatuses 40 to 43. Step S210: As soon as the one of the print apparatuses 40 to 43 completes the image formation process (print job), this procedure terminates (End).

Thus, all the resources printable by each of the print apparatuses 40 to 43 are stored in the print server 50. This can make the print apparatuses 40 to 43 share the printable fonts with one another. In view of this, the print apparatuses 40 to 43 can execute the image formation process efficiently.

Figure 9:
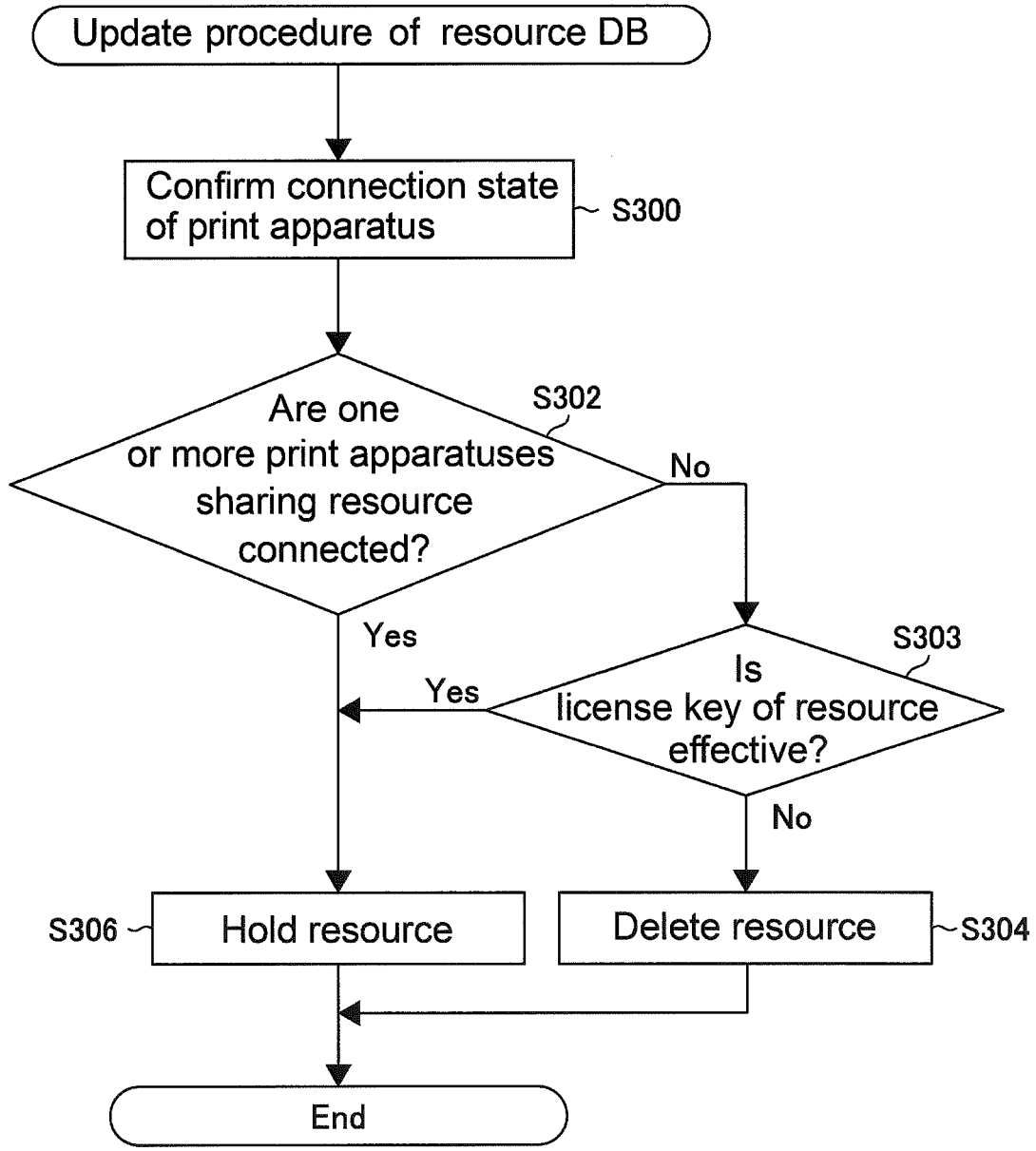
FIG. 9 illustrates a resource DB update procedure executed by the computer functioning as the print server according to the one embodiment.

Next, a description will be given of an update procedure of the resource DB 54*b*. FIG. 9 illustrates the update procedure of the resource DB 54*b* executed by the computer of the print server 50.

Step S300: The control unit 56 confirms whether or not the print apparatuses 40 to 43, which are the providers of respective pieces of the resource information registered in the resource DB 54*b*, are connected to the network 20. Specifically, the control unit 56 refers to each piece of the identification information registered in the resource DB 54*b* to specify each of the print apparatuses 40 to 43 corresponding to each piece of the identification information. Then, the control unit 56 transmits a signal for confirming whether or not each of the print apparatuses 40 to 43 is connected to the network 20 to each of the print apparatuses 40 to 43. In contrast to this, the control unit 56 of the print server 50 confirms whether or not each of the print apparatuses 40 to 43 has responded to the confirmation request.

Step S302: The control unit 56, based on the signals responded from the respective print apparatuses 40 to 43, determines whether or not one or more of the print apparatuses, with which the resources are shared, are connected. Specifically, the control unit 56 determines whether or not, among all the print apparatuses for which any one of the resources are available in common, at least one or more of the print apparatuses have responded to the confirmation request.

Step S303: If one or more of the print apparatuses are not connected ("No" in Step S302); that is, if none of the print apparatuses 40 to 43, for which the resource information is available in common, responds to the confirmation request, the control unit 56 determines whether or not the license key corresponding to the identification information is effective.

Step S304: If the license key is expired ("No" is Step S303), the control unit 56 erases the resource and the license key from the storage unit 54, and terminates this procedure (End). According to this, the control unit 56 deletes the resource information registered in the resource DB 54*b*. Specifically, the type information of the resource, the identification information of each of the print apparatuses 40 to 43 which have not responded to the confirmation request, and the validity term information are deleted from the resource DB 54*b*.

Step S306: If one or more of the print apparatuses are connected ("Yes" in Step S302); that is, among all the print apparatuses, for which the resource is available in common, if at least one or more of the print apparatuses have responded to the confirmation request, or if the license key of the resource is effective ("Yes" in Step S303), the control unit 56 terminates this process while holding the resource (End).

Thus, with the image forming system 10 and the image forming system programs of the embodiment, when causing one of the print apparatuses 40 to 43 to execute the image formation process in response to the print request from one of the client computers 30 to 33, the print server 50 does not need to pull up (install) the resource from another of the print apparatuses 40 to 43. This can cause each of the print apparatuses 40 to 43 to execute the image formation process based on the print data without reducing the print performance.

With the image forming system 10 and the image forming system programs of the embodiment, if the resource, which is extracted into the print data, is available for any one of the print apparatuses 40 to 43 connected to the network 20, all the print apparatuses 40 to 43 can obtain an identical output result.

Since the update of the resource DB 54b does not permit execution of the image formation process using the resource information, which is not supported by all of the print apparatuses 40 to 43 connected to the network 20, the resource information can be managed strictly.

Since the resource provided for the print server 50 is accompanied with a license necessary to use the resource, if the license is effective, the print server 50 can continue using the resource even when the print apparatus, which is the provider of the resource, is disconnected from the network 20.

Supplementary Note

As described above, the image forming system 10 according to the disclosure includes the print server 50, the request unit 56a, the providing unit 48d, and the registration unit 56a. The print server 50, in response to a print request from at least one of the client computers 30 to 33, which create print data, causes at least one of the image forming apparatuses 40 to 43 connected to the network 20 to execute the image formation process based on the print data. The request unit 56a causes the print server 50 to make a request to the at least one of the image forming apparatuses 40 to 43 newly connected to the network 20 for a resource related to the image formation process, for which the at least one of the image forming apparatuses 40 to 43 is available, and a license key including its validity term information for use of the resource in the print server 50. The providing unit 48d, in response to the request by the request unit 56a, causes the at least one of the image forming apparatuses 40 to 43 to provide the resource and the license key for the print server 50 via the network 20. The registration unit 56a causes the print server 50 to store the resource and the license key provided by the at least one of the image forming apparatuses 40 to 43 in the storage unit 54, and registers in the resource DB (database) 54b of the print server 50 pieces of resource information related to the resource and the license key.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system comprising:
a plurality of image forming apparatuses connected to a network;
a client computer that is connected to the network and creates print data; and
a print server that causes the plurality of the image forming apparatuses connected to the network to execute an image formation process based on the print data in response to a print request from the client computer that creates the print data, wherein the print server requests, in response to a new connection of the plurality of the image forming apparatuses to the network, a resource related to the image formation process available for the plurality of the image forming apparatuses, and a license key including a validity term of a license for using the resource in the print server to the newly connected image forming apparatuses, the plurality of the image forming apparatuses provide the resource and the license key for the print server via the network in response to the print request, and the print server stores the resource and the license key provided by the plurality of the image forming apparatuses and registers resource information related to the resource and the license key in a database of the print server.

2. The image forming system according to claim 1,
wherein the print server further:
confirms whether or not an image forming apparatus as a provider of the resource information registered in the database is connected to the network, and whether or not the validity term of the license key is expired; and
erases the resource and updates the database by deleting the resource information related to the resource from the database when all the image forming apparatuses for which any one of resources is available in common are disconnected from the network and the validity term of the license key of the resource is expired.

3. An image forming method, by an image forming system that includes a plurality of image forming apparatuses connected to a network; a client computer that is connected to the network and creates print data; and a print server that causes the plurality of the image forming apparatuses connected to the network to execute an image formation process based on the print data in response to a print request from the client computer that creates the print data, the method comprising:
via the print server,
requesting, in response to a new connection of the plurality of the image forming apparatuses to the network, a resource related to the image formation process available for the plurality of the image forming apparatuses, and a license key including a validity term of a license for using the resource in the print server to the newly connected image forming apparatuses;
via the plurality of the image forming apparatuses,
providing the resource and the license key for the print server via the network in response to the print request; and
via the print server,
storing the resource and the license key provided by the plurality of the image forming apparatuses, and
registering resource information related to the resource and the license key in a database of the print server.

4. The image forming method according to claim 3 further comprising:
via the print server,
confirming whether or not an image forming apparatus as a provider of the resource information registered in the database is connected to the network, and whether or not the validity term of the license key is expired, and
erasing the resource and updating the database by deleting the resource information related to the resources from the database when all the image forming apparatuses for which any one of resources is available in common are disconnected from the network and the validity term of the license key of the resource is expired.

* * * * *